United States Patent
Hwang

(10) Patent No.: US 7,128,461 B2
(45) Date of Patent: Oct. 31, 2006

(54) BACK LIGHT APPARATUS

(75) Inventor: Ping-Feng Hwang, Miao-Li County (TW)

(73) Assignee: Coretronic Corporation, Hsinchu (TW)

( * ) Notice: Subject to any disclaimer, the term of this patent is extended or adjusted under 35 U.S.C. 154(b) by 48 days.

(21) Appl. No.: 10/707,494

(22) Filed: Dec. 18, 2003

(65) Prior Publication Data

US 2004/0120161 A1 Jun. 24, 2004

(30) Foreign Application Priority Data

Dec. 19, 2002 (TW) ............................. 91221018 U

(51) Int. Cl.
*F21V 7/04* (2006.01)
(52) U.S. Cl. .................. 362/632; 362/633; 362/634
(58) Field of Classification Search ............... 362/287, 362/294, 105, 306, 390, 402, 444, 97, 632–634
See application file for complete search history.

(56) References Cited

U.S. PATENT DOCUMENTS 3,140,831 A * 7/1964 Strange ..................... 362/634
6,039,461 A * 3/2000 Cummings et al. ......... 362/287
6,641,276 B1 * 11/2003 Macher et al. ............... 362/84
6,902,300 B1 * 6/2005 Lee ............................ 362/306
2001/0006461 A1 7/2001 Okuno
2002/0131266 A1 * 9/2002 Naghi et al. ................ 362/104
2004/0257792 A1 * 12/2004 Yu et al. ...................... 362/31

FOREIGN PATENT DOCUMENTS

EP 1 070 913 A3 11/2003

* cited by examiner

*Primary Examiner*—Sandra O'Shea
*Assistant Examiner*—Anabel Ton
(74) *Attorney, Agent, or Firm*—Winston Hsu

(57) ABSTRACT

A back light apparatus comprises a base having a container, a lamp module, a diffuser, and at least one elastic device. The inside surface of the base are coated a reflection layers. The lamp module consists of CCFLs disposed in the container. One end of the elastic element is fixed on the bottom surface of the container; the other end supports the diffuser. The elastic device reduces the deformation of the diffuser to avoid forming the uneven surface on the diffuser. That is, it can provide the high and even brightness for a liquid crystal display panel.

11 Claims, 6 Drawing Sheets

BACK LIGHT APPARATUS

BACKGROUND OF INVENTION

1. Field of the Invention

The present invention relates to a liquid crystal display, and more particularly to a back light apparatus for use in a liquid crystal display.

2. Description of the Prior Art

A back light module is the key component for liquid crystal display (LCD). By means of the brightness and uniform light source being provided by the backlight module, the LCD panel can display images.

The backlight module can divide into a sidelight mode and a direct light mode according to the position of the light source. The sidelight mode places lamps of the light source on the side edge of a LCD panel and, then, uses a guiding-panel to control light path so that light beams project to a diffuser below the panel and provide uniform light beams. Because of the position of the light source, it suits being used in a light, thin, and power saving display equipment, e.g. a monitor of a notebook. But for big size display and brightness occasions, e.g. TV and desk PC. The sidelight mode cant provide enough brightness. Hence, it needs the direct light mode to directly place the light source below the display panel. The contain space for the light source is bigger, and has a capacity for over two lamps to increase the brightness of the light source and satisfy what's need.

Referring to FIG. 1 and FIG. 2, a direct light back light module 10 comprises a rectangular frame 11 having a container 111, a light source module 12, a diffuser 13, and a supporting rod 14. The surface of the container 111 has a reflection layer 112 to reflect the light beam provided by the light source module 12 to the diffuser 13. The light source module 12 comprises a plurality of light tubes 121 side by side inside the container 111. The two ends of the diffuser 13 fix on a top surface 113 of the rectangular frame 11 and, then, the supporting rod 14 properly is placed on the bottom of the rectangular frame 11, which has one end holding the diffuser 13 to support the diffuser 13.

Due to the supporting rod 14 directly contacting the diffuser 13, the contact part hinders the light from passing. For avoiding the diffuser 13 forming bigger dark area, the supporting rod 14 generally uses a cone having a smaller cross-section on top point and, thus, the top of the supporting rod 14 directly contacts the diffuser 13 with a pointed tip. As the size of the back light module 10 increasing or the inside temperature of the frame 11 raising that causes by the light source module 12, the deformation of the diffuser 13 is increasing and makes downward indentation. Meanwhile, the pointed tip of the supporting rod 14 easily protrudes the diffuser 13 so the diffuser 13 forms a uneven surface or even causes the unequal interval between the diffuser 13 and the light source module 12 such that the diffuser 13 has uneven brightness. The LCD panel display images have light and shade phenomenon. In addition, the supporting rod 14 is placed inside the container 111. As the light source providing light beams impinging onto the surface of the supporting rod 14, the light beams cant effectively reflect or transmissive and, hence, cant project to the surface of the diffuser 13, which easily causes illumination light source loss.

SUMMARY OF INVENTION

An object of the present invention is to provide a back light apparatus. By means of the elastic device, the diffuser has the supporting buffer to reduce the deformation of the diffuser.

Another object of the present invention is to provide a back light apparatus. By means of the buffer provided by the elastic device, the diffuser can avoid damage to provide high brightness and even lightness light source.

Still another object of the present invention is to provide a back light apparatus. The diffuser is supported by the elastic device to keep the same space for providing high brightness and even lightness.

Further another object of the present invention is to provide a back light apparatus to reduce the illumination loss by means of the reflection layer.

To achieve the above and other objects, the back light apparatus of the present invention comprises a frame having a container, a light source module, a diffuser, and at least one elastic device. The inner surface of the container has a reflection layer, and the light source module has a plurality of cold cathode fluorescent lamps side by side placed inside the container. The diffuser is placed upon the top of the frame. The elastic device has one end fixed on the bottom of the container and has the other end pressed to the diffuser. The top of the elastic device has a protrusion which could be transparent materials or high reflection materials to avoid the spots. In addition, the bottom of the container could have a fixing base or a cavity for containing the elastic device. Further, the fixing base could have a reflection layer to raise the reflection area of the light beam.

BRIEF DESCRIPTION OF DRAWINGS

The above and other objects, advantages, and features of the present invention will be understood from the following detailed description of the invention when considered in connection with the accompanying drawings below.

DETAILED DESCRIPTION

The First Embodiment

Figure 1:
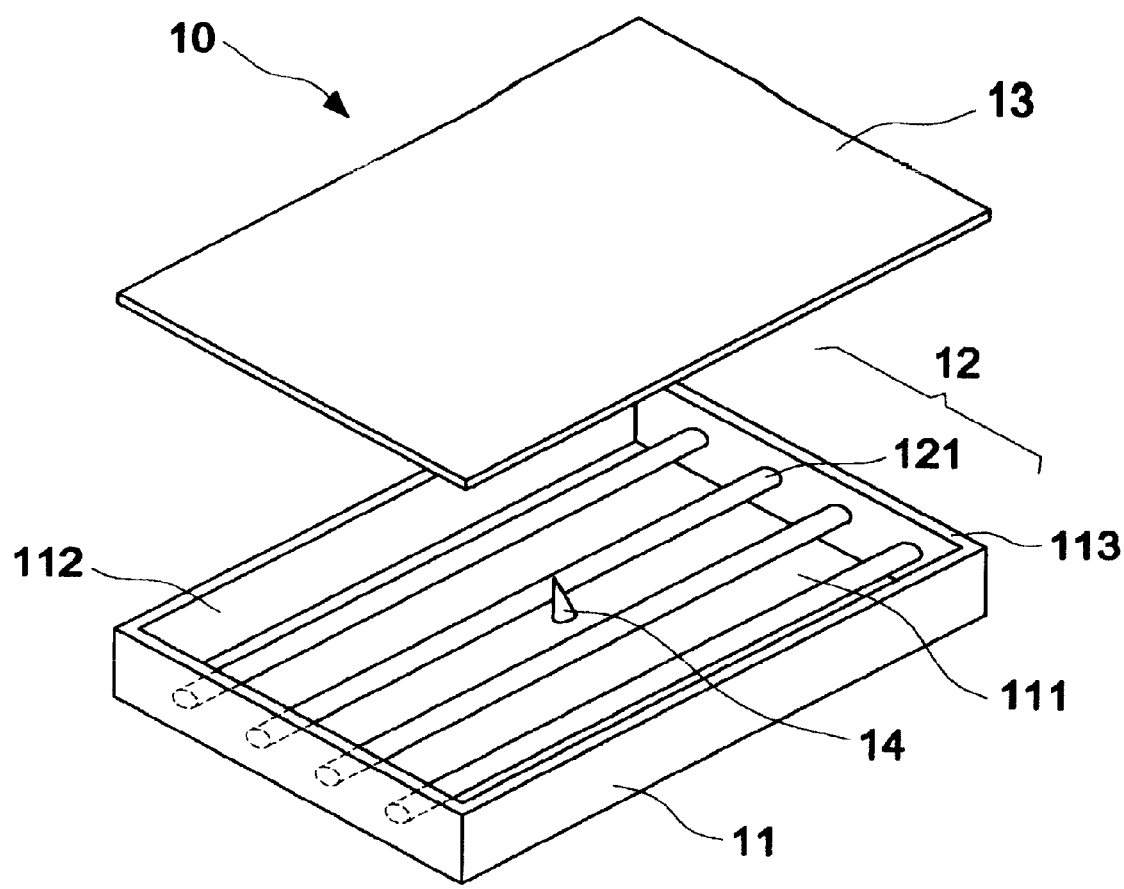
FIG. 1 is an explored view showing a back light apparatus of a direct light mode of the prior art.
Figure 2:
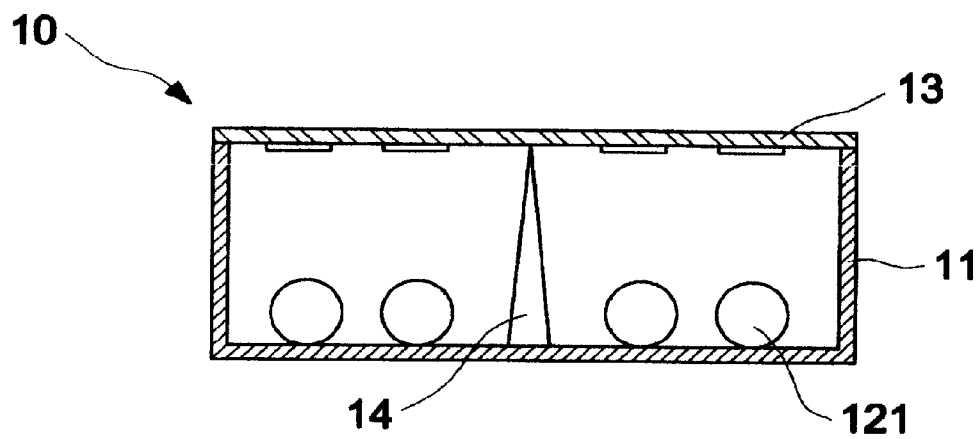
FIG. 2 is a sectional view showing a back light apparatus of a direct light mode of the prior art.
Figure 3:
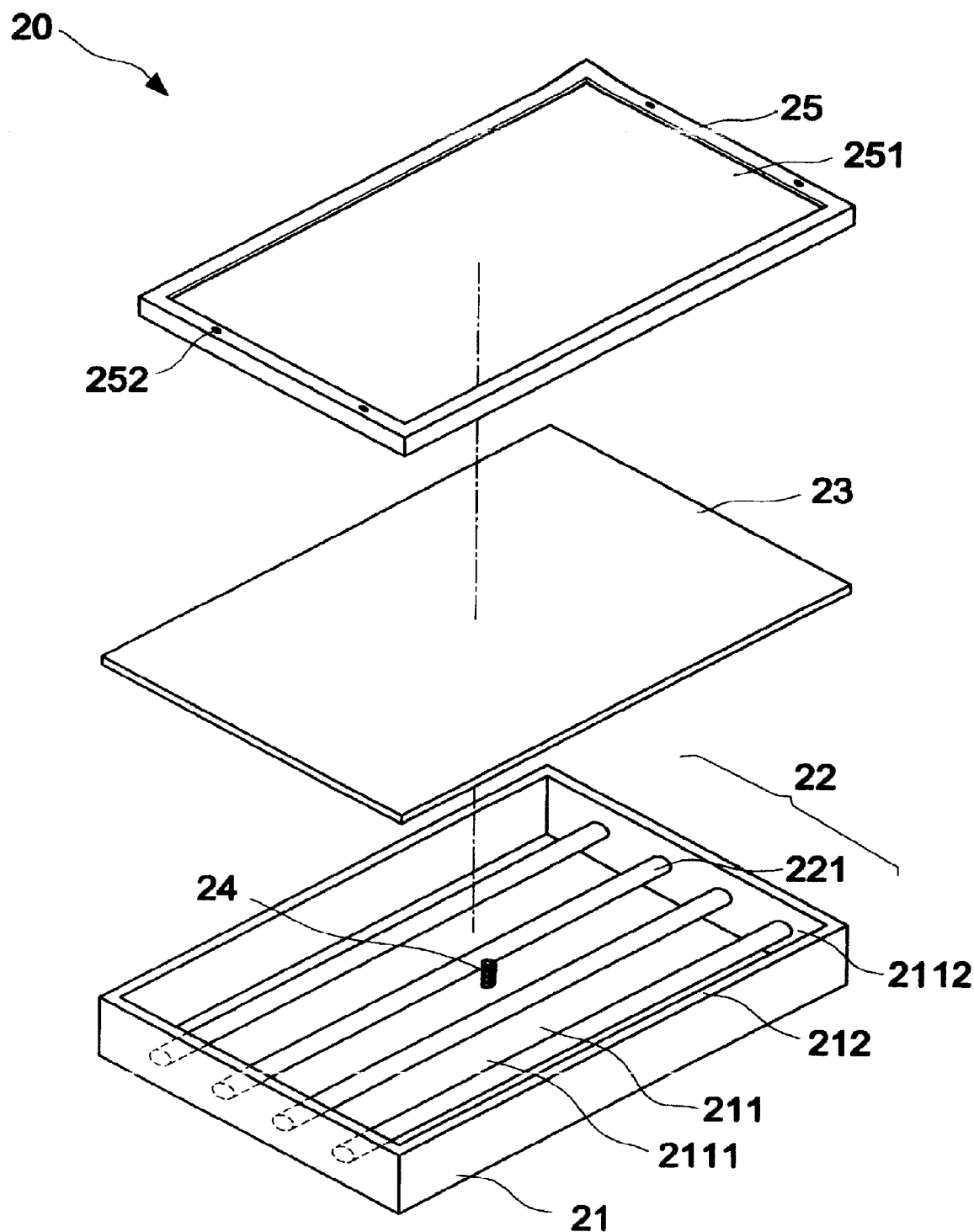
FIG. 3 is an explored view showing the first embodiment of a back light apparatus of the present invention.

Referring to FIG. 3, a back light apparatus 20 of the present invention comprises a rectangular frame 21, a light source module 22, a diffuser 23, at least one elastic device 24, and a cover 25.

Figure 4:
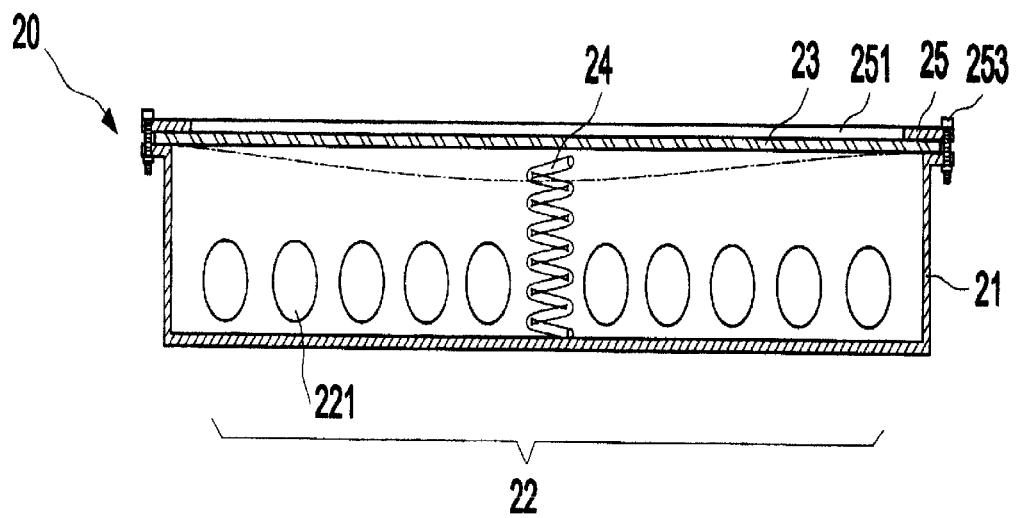
FIG. 4 is a sectional view showing the first embodiment of a back light apparatus of the present invention.
Figures 5A, 5B, 5C:
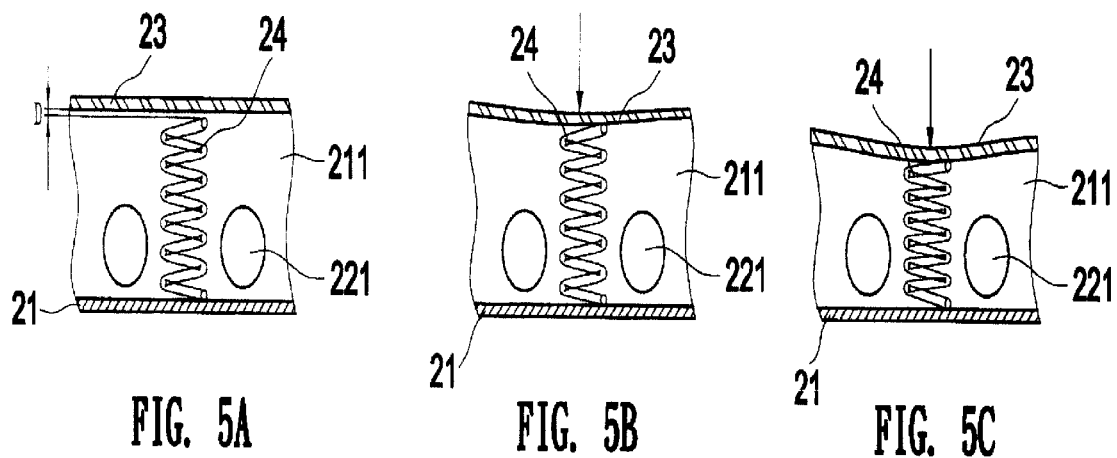
FIGS. 5A, 5B and 5C are active schematic views showing the first embodiment of a back light apparatus of the present invention.

The rectangular frame 21 has a container 211 and a top 212, a bottom surface 2111 and an inner surface 2112 of the container 211 have a reflection layer to reflect light beams provided by the light source 22 onto the diffuser 23. The light source module 22 is placed inside the container 211, which comprises a plurality of cold cathode fluorescent lamp 221 (CCFL). The lamps 221 have properly interval and horizontally placed inside the container 211, which has two ends respectively extending to the inner surface 2112 of the frame 21 for fasten. The diffuser 23 is placed upon the top 212 of the rectangular frame 21. The surface of the diffuser 23 facing to the lamps 221 is as a diffuser layer so the light beams through the diffuser layer causes the diffusion that makes the light beams even. The diffuser 23 is made by plastic material. The elastic device 24 is erected and placed inside the container 211, which has one end fixed on the bottom 2111 of the container 211 and the other end forming a space D with the diffuser 23 (as shown in FIG. 5A). The elastic device 24 can be a transparent or high reflection-material spring, elastic piece or plastic element to reduce the effect upon reflection light passing through the diffuser 23. As shown in FIG. 4, the cover 25 is covered on the top 212 of the frame 21, which has a winder 251 smaller than the area of the diffuser 23. Side edges of the cover 25 have a plurality of fixing openings 252 for screwing devices 253 to the top 212 of the frame 21 that clips the two ends of the diffuser 23 for fixing.

The back light apparatus of the present invention is placed behind the LCD panel (not shown in drawing). Part of the light beams provided by the lamps 221 directly project to the diffuser 23, and part of the light beams reflected by the reflection layer of the inner of the container 211 project to the diffuser 23. Then, the light beams pass through the diffuser 23 causes the diffusion to provide high and even brightness for LCD panel to display images.

As shown in FIG. 5A, the diffuser 23 of the back light apparatus 20 of the present invention has a space D with the elastic device 24 that can avoid effecting the light beam passing through the diffuser 23 and forming dark points. As the light source module 22 using for a period, the temperature raises so the plastic diffuser 23 is heated and caused downward deformation. Referring to FIG. 5B, as contacting with the elastic device 24, the diffuser 23 is supported by the elastic device 24 to reduce the deformation of the diffuser 23 and keep the same space for providing high and even brightness. As the deformation of the diffuser 23 increasing to press the elastic device 24, referring to FIG. 5C, the elastic device 24 can compress the elastic device 24 for buffer. Hence, the elastic device 24 doesn't protrude the diffuser 23 to avoid damaging the diffuser 23 to form an uneven surface. Furthermore, the elastic device 24 gradually provides more support to further prevent the diffuser 23 increasing deformation so the diffuser 23 has a better flat providing high and even brightness for LCD panel.

Figure 6:
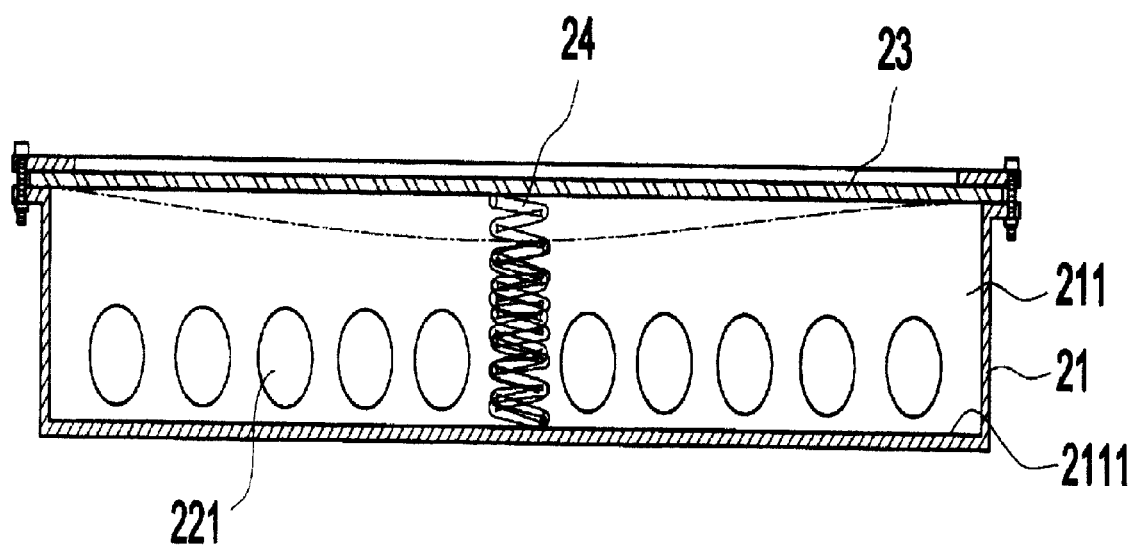
FIG. 6 is a sectional view showing the elastic device for a back light apparatus of a first embodiment of the present invention.

Referring to FIG. 6, for the size of the monitor becomes bigger; the size of the diffuser 23 is bigger. The plastic diffuser 23 only fixes upon around the rectangular frame 21, and the central part of the diffuser 23 is easier to form downward deformation. Hence, one end of the elastic device 24 of the present invention is fixed to the bottom 2111 of the container 211, and the other end directly holds the diffuser 23 to stably support the diffuser 23. Thus, the deformation of the diffuser 23 can be reduced so that the diffuser 23 has a better flat to provide high and even brightness for LCD panel.

The Second Embodiment

Figure 7:
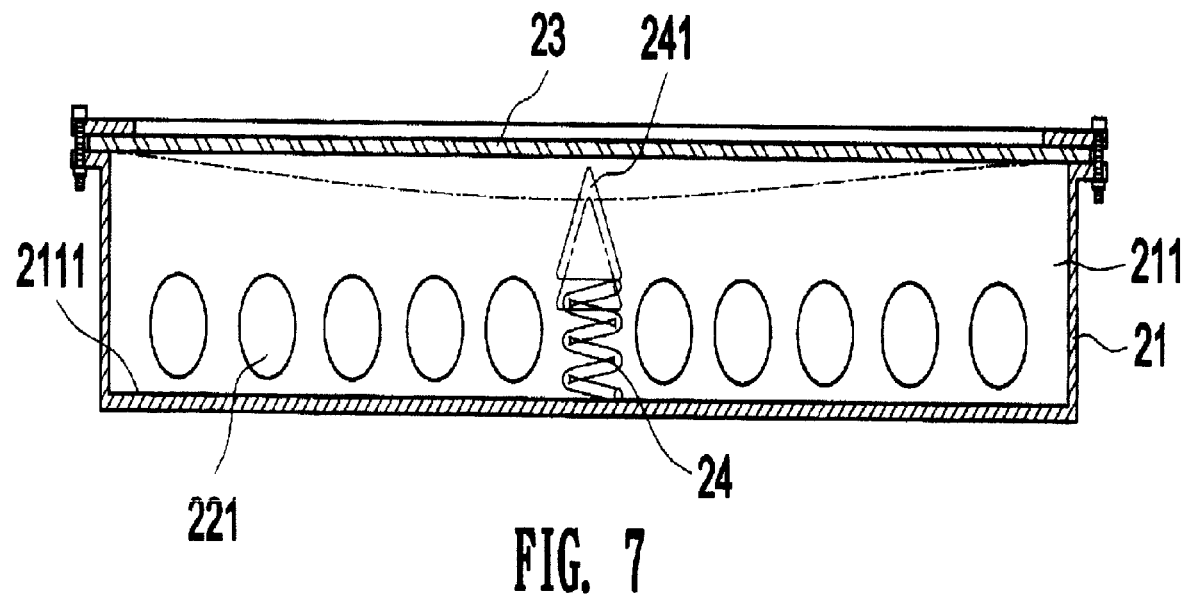
FIG. 7, FIG. 8, FIG. 9, and FIG. 10 are schematic views showing a back light apparatus having a cavity of the second embodiment of the present invention.

Referring to FIG. 7, the same or similar devices of the present embodiment uses the same marks as the above-mentioned first embodiment. The difference between the present embodiment and the above-mentioned embodiment is that the elastic device 24 could use a spring of metal. The elastic device 24 can collocate a protrusion 241 upon the elastic device 24 to replace the transparent or high reflection optical material spring to lower the cost. The protrusion 241 can be transparent or high reflection material. The present embodiment uses the cone and transparent-material as the protrusion 241, so the contacting area between the protrusion 241 and the diffuser 23 is decreased not to hinder the light beams and to avoid the diffuser 23 forming dark points. In addition, the protrusion 241 could be elastic material to prevent directly protruding the diffuser 23 to damage the diffuser 23 forming an indent. Besides, because the protrusion 241 placed inside the container 211, for avoiding the illumination loss, the protrusion 241 could have reflection layer on the surface.

Figure 8:
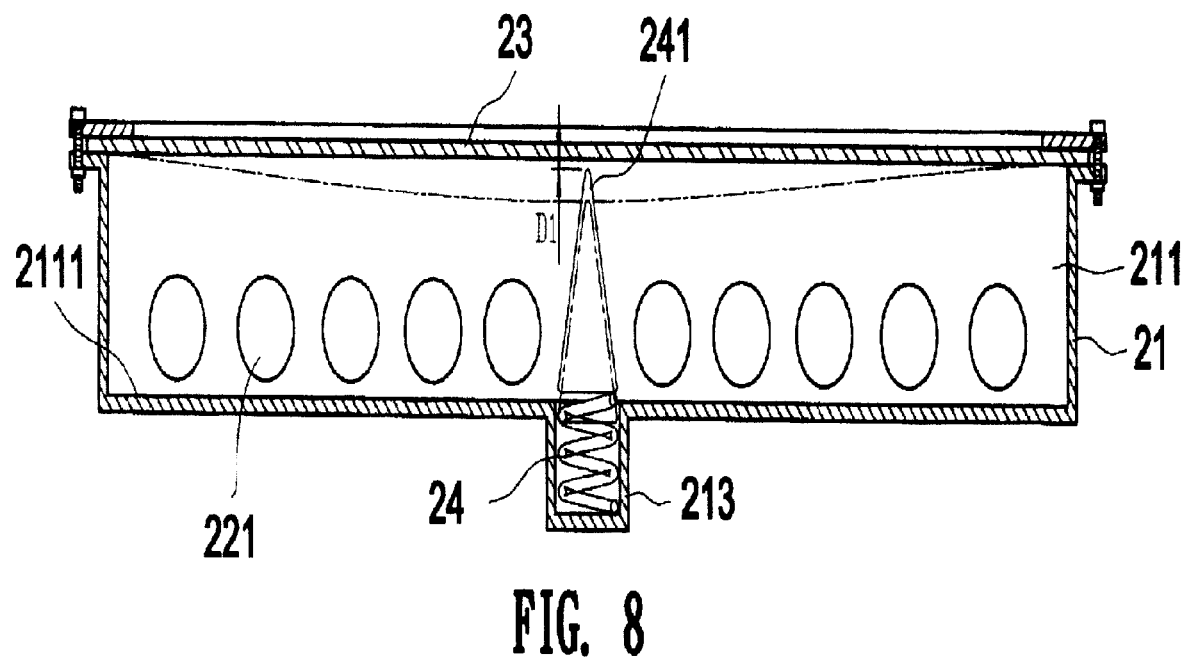

Referring to FIG. 8, the bottom 2111 of the container 211 has a cavity 213 for placing the elastic device 24. The protrusion 241 fixes upon the elastic device 24, which protrudes out of the top of the cavity 213 and keeps a space D1 with the diffuser 23 or presses to the diffuser 23. The spring 24A having bad reflection is hidden inside the cavity 213 to reduce hindering the light beams. Hence, the light beams provided by the lamps 221 can be reflected by the protrusion 241 and projected onto the diffuser 23 to reduce the illumination loss and shadow.

Figure 9:
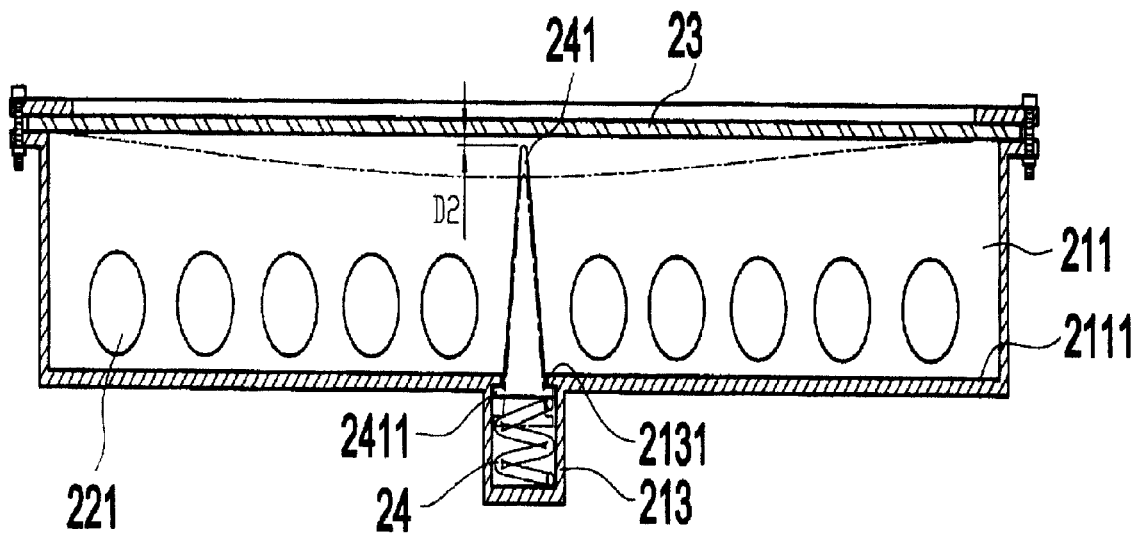

In addition, referring to FIG. 9, the bottom 2111 of the container 211 has the cavity 213 to place the elastic device 24 inside the cavity 213. An opening 2131 of the cavity 213 is smaller than the than the diameter of the elastic device 24. The bottom of the protrusion 241 has a flange 2411. The flange 2411 is mounted in the cavity 213 to limit only the protrusion 241 out of the cavity 213. The protrusion 241 keeps a space D2 with the diffuser 23 or presses to the diffuser 23. The light beams provided by the lamps 221 could be reflected by the protrusion 241 to the diffuser 23 as being used. In addition, according the size of the diffuser 23, properly set original elasticity of the elastic device 24 so that could reduce the illumination loss and shadow caused by the deformation of the diffuser 23.

Figure 10:
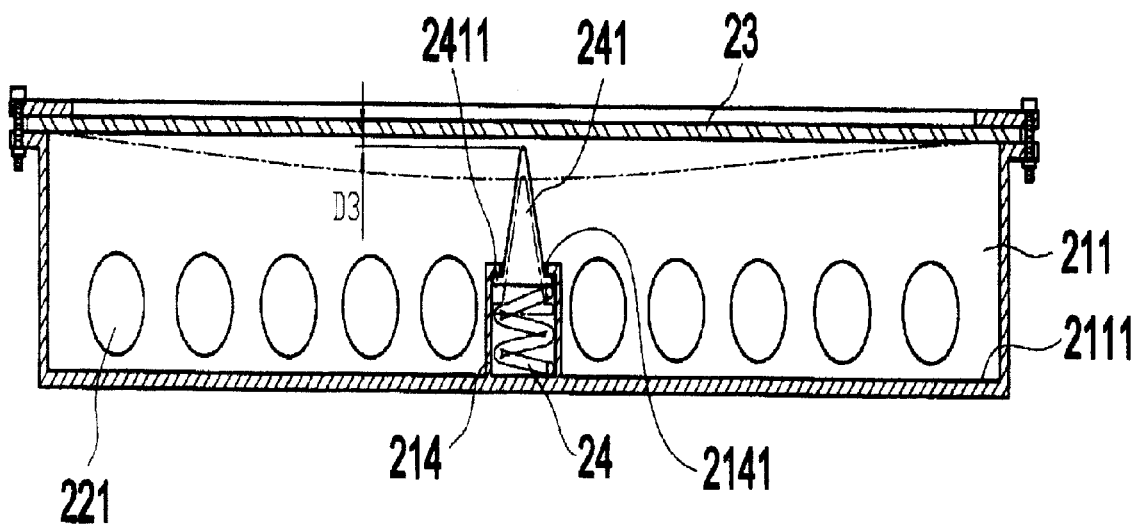

Referring to FIG. 10, a fixing base 214 is arranged on the bottom 2111 of the container 211. The fixing base 214 could contain the elastic device 24 so the volume of the back light apparatus 20 wont increase to shrink the product volume. The size of an opening 2141 of the fixing base 214 is smaller than the diameter of the elastic device 24 and the surface of the fixing base 214 has a reflection layer. The bottom of the protrusion 241 has a flange 2411. The flange 2411 is mounted in the fixing base 214 to limit only the protrusion 241 out of the fixing base 214. The protrusion 241 keeps a space D3 with the diffuser 23 or presses to the diffuser 23. The light beams provided by the lamps 221 could be reflected by the protrusion 241 and the reflection layer of the fixing base 214 to the diffuser 23 to reduce the illumination loss and shadow caused by the deformation of the elastic device 24.

It will be apparent to those skilled in the art that in light of the forgoing disclosure, many alternations and modifications are possible in the practice of this invention without departing from the spirit or scoop thereof. Accordingly, the scoop of the invention is to be considered in accordance with the substance defined in the following claims.

What is claimed is:

1. A back light apparatus, comprising:
a frame creating a container;
a light source module which is placed inside said container;

a diffuser which is placed upon said light source module; and at least one spring placed inside said container, said spring having a first end fixed on a bottom of said container and a second end supporting said diffuser.

2. The back light apparatus according to claim 1, wherein said spring is formed out of transparent material.

3. The back light apparatus according to claim 1, wherein said spring is formed out of highly reflective material.

4. The back light apparatus according to claim 1, wherein said spring is formed out of plastic.

5. The back light apparatus according to claim 1, further comprising a fixing base formed on the bottom of said container, said spring being placed inside said fixing base.

6. The back light apparatus according to claim 1, wherein said container further comprises a cavity formed in the bottom, said spring being placed inside said cavity.

7. The back light apparatus according to claim 1, wherein said second end of said spring is positioned below said diffuser a predetermined distance for supporting said diffuser when said diffuser deforms downwards.

8. The back light apparatus according to claim 1, wherein said second end of said spring directly contacts said diffuser for supporting said diffuser.

9. The back light apparatus according to claim 5, wherein said fixing base has an opening whose size is smaller than the diameter of said spring, a protruding device being formed on top of said spring, the bottom of said protruding device having a flange mounted inside said fixing base.

10. The back light apparatus according to claim 6, wherein said cavity has an opening whose size is smaller than the diameter of said spring, a protruding device being formed on top of said spring, the bottom of said protruding device having a flange mounted inside said cavity.

11. The back light apparatus according to claim 7, wherein said second end of said spring does not contact other objects when said second end of said spring is positioned below said diffuser said predetermined distance.

* * * * *